United States Patent
Huang et al.

(10) Patent No.: US 12,221,384 B2
(45) Date of Patent: Feb. 11, 2025

(54) CRACK SELF-HEALING FUNCTIONALLY GRADIENT MATERIAL FOR CERAMIC CUTTING TOOLS AND PREPARATION METHOD THEREOF

(71) Applicants: SHANDONG UNIVERSITY, Shandong (CN); YANSHAN UNIVERSITY, Hebei (CN)

(72) Inventors: Chuanzhen Huang, Qinhuangdao (CN); Xinyao Cui, Jinan (CN); Hanlian Liu, Jinan (CN); Zhenyu Shi, Jinan (CN); Peng Yao, Jinan (CN); Xiaolan Bai, Jinan (CN); Zhen Wang, Qinhuangdao (CN); Longhua Xu, Qinhuangdao (CN); Dun Liu, Jinan (CN); Shuiquan Huang, Qinhuangdao (CN); Hongtao Zhu, Jinan (CN); Bin Zou, Jinan (CN)

(73) Assignees: SHANDONG UNIVERSITY, Jinan (CN); YANSHAN UNIVERSITY, Hebei (CN)

( * ) Notice: Subject to any disclaimer, the term of this patent is extended or adjusted under 35 U.S.C. 154(b) by 144 days.

(21) Appl. No.: 17/943,596

(22) Filed: Sep. 13, 2022

(65) Prior Publication Data
US 2023/0303453 A1    Sep. 28, 2023

(30) Foreign Application Priority Data
Mar. 23, 2022 (CN) .......................... 2022102899312

(51) Int. Cl.
| | |
|---|---|
| C04B 35/58 | (2006.01) |
| B26D 1/00 | (2006.01) |
| C04B 35/626 | (2006.01) |
| C04B 35/645 | (2006.01) |

(52) U.S. Cl.
CPC .... C04B 35/58021 (2013.01); C04B 35/6261 (2013.01); C04B 35/6264 (2013.01); C04B 35/645 (2013.01); B26D 2001/002 (2013.01); C04B 2235/3843 (2013.01); C04B 2235/3886 (2013.01); C04B 2235/3891 (2013.01); C04B 2235/404 (2013.01); C04B 2235/405 (2013.01); C04B 2235/604 (2013.01); C04B 2235/6562 (2013.01); C04B 2235/6567 (2013.01); C04B 2235/75 (2013.01); C04B 2235/785 (2013.01); C04B 2235/786 (2013.01)

(58) Field of Classification Search
CPC .......... C04B 35/58021; C04B 35/6261; C04B 35/6264; C04B 35/645; C04B 2235/3843; C04B 2235/3886; C04B 2235/3891; C04B 2235/404; C04B 2235/405; C04B 2235/604; C04B 2235/6562; C04B 2235/6567; C04B 2235/75; C04B 2235/785; C04B 2235/786; C04B 35/80; C04B 35/622; C04B 2235/3847; C04B 2235/602; C04B 2235/96; B26D 2001/002; B22F 2999/00; B22F 7/008; B22F 2005/001; B22F 2998/10; C22C 29/04

See application file for complete search history.

(56) References Cited

U.S. PATENT DOCUMENTS

| | | | |
|---|---|---|---|
| 2009/0011252 A1* | 1/2009 | Stein .................. | C23C 16/26 428/446 |
| 2009/0297720 A1* | 12/2009 | Ramgopal ............... | C23C 30/00 427/455 |

* cited by examiner

*Primary Examiner* — Nathan L Van Sell
(74) *Attorney, Agent, or Firm* — Oliff PLC

(57) ABSTRACT

A crack self-healing functionally gradient material for ceramic cutting tools and a preparation method thereof. The material for ceramic cutting tools has a symmetrical gradient structure, and based on the percentage by mass, components of each layer include 50%-80% of $Ti(C_7,N_3)$, 25%-5% of $(W_7,Ti_3)C$ and 20%-0% of $TiSi_2$; contents of components of layers that are symmetrical relative to a central layer are the same and a thickness is symmetrically distributed; a content of $Ti(C_7,N_3)$ gradually increases from the surface layer to the central layer, contents of $(W_7,Ti_3)C$ and $TiSi_2$ gradually decrease by 5% from the surface layer to the central layer, and the contents of Ni and Mo gradually increase from the surface layer to the central layer.

9 Claims, 3 Drawing Sheets

CRACK SELF-HEALING FUNCTIONALLY GRADIENT MATERIAL FOR CERAMIC CUTTING TOOLS AND PREPARATION METHOD THEREOF

TECHNICAL FIELD

The present disclosure falls within the technical field of preparation of cutting tool materials, and in particular relates to a crack self-healing functionally gradient material for ceramic cutting tools and a preparation method thereof.

BACKGROUND

Information of the Related Art part is merely disclosed to increase the understanding of the overall background of the present disclosure, but is not necessarily regarded as acknowledging or suggesting, in any form, that the information constitutes the prior art known to a person of ordinary skill in the art.

Ceramic cutting tools possess excellent physical and chemical properties based on which they are more suitable for the field of high-speed machining of difficult-to-machine materials when compared with carbide cutting tools. However, due to their greatest disadvantages of great brittleness and sensitivity to crack defects, how to reduce the brittleness has always been focused by researchers. An approach to reduce the brittleness of ceramic materials is to employ a crack self-healing method, which realizes crack self-healing by virtue of the properties of materials during the crack propagation process. At present, materials used as healing agents in the ceramic materials include SiC, $MoSi_2$, MAX phase, $TiB_2$ and $h-BN@Al_2O_3$, which have the deficiencies of high temperature of heat treatment, long time, and low recovery rate of flexural strength of the ceramic materials after healing. Nowadays, there is no research on the combination of crack self-healing materials and gradient structure materials, which can slow down crack propagation and can also realize crack self-healing.

SUMMARY

For the deficiencies of the prior art, a crack self-healing functionally gradient material for ceramic cutting tools and a preparation method thereof are provided. The material takes $Ti(C_7,N_3)$ as a matrix phase, $(W_7,Ti_3)C$ and $TiSi_2$ as reinforced phases, and Ni and Mo as metal phases, and the proportion of each component is changed in gradient direction. By effectively combining two advantages of the crack self-healing materials and the gradient structure materials, the ceramic materials not only have high mechanical properties and high thermal shock resistance, but also can finish the crack self-healing process at low healing temperature and within short healing time, thereby greatly recovering the flexural strength of the ceramic materials and prolonging the service life of ceramic cutting tools.

To achieve the foregoing objective, the present disclosure provides the following technical solutions:

In a first aspect, the present disclosure provides a crack self-healing functionally gradient material for ceramic cutting tools, which takes titanium carbonitride as a matrix phase, tungsten-titanium carbide and titanium silicide as enhanced phases, and nickel and molybdenum as metal additive phases; the crack self-healing functionally gradient material for ceramic cutting tools has a symmetrical gradient layered structure, a content of titanium carbonitride increases gradually from a surface layer to a central layer, contents of tungsten-titanium carbide and titanium silicide decrease by 5% gradually from the surface layer to the central layer, and contents of nickel and molybdenum increase gradually from the surface layer to the central layer.

Further, based on the percentage by mass, components of each layer are: 50%-80% of titanium carbonitride, 5%-25% of tungsten-titanium carbide, 0%-20% of titanium silicide, 3%-9% of nickel, and 2%-6% of molybdenum.

Further, the symmetrical gradient layered structure includes 3 layers, 5 layers, or 7 layers.

Further, when the structure includes 3 layers, a thickness of a three-layered gradient layer is determined based on a formula: thickness of surface layer/thickness of secondary surface layer=0.3; when the structure includes 5 layers, a thickness of a five-layered gradient layer is determined based on a formula: thickness of surface layer/thickness of secondary surface layer=thickness of secondary surface layer/thickness of middle layer=0.3; and when the structure includes 7 layers, a thickness of a seven-layered gradient layer is determined based on a formula: thickness of surface layer/thickness of secondary surface layer=thickness of secondary surface layer/thickness of middle layer=thickness of middle layer/thickness of central layer=0.3.

Further, when the structure includes 3 layers, the surface layer is composed of following raw materials in percentage by mass: 50-55 wt % of titanium carbonitride, 25 wt % of tungsten-titanium carbide, 15-20 wt % of titanium silicide, 3 wt % of nickel, and 2 wt % of molybdenum; and the secondary surface layer is composed of following raw materials in percentage by mass: 57.5-62.5 wt % of titanium carbonitride, 20 wt % of tungsten-titanium carbide, 10-15 wt % of titanium silicide, 4.5 wt % of nickel, and 3 wt % of molybdenum.

Further, when the structure includes 5 layers, the surface layer is composed of following raw materials in percentage by mass: 50-55 wt % of titanium carbonitride, 25 wt % of tungsten-titanium carbide, 15-20 wt % of titanium silicide, 3 wt % of nickel, and 2 wt % of molybdenum; the secondary surface layer is composed of following raw materials in percentage by mass: 57.5-62.5 wt % of titanium carbonitride, 20 wt % of tungsten-titanium carbide, 10-15 wt % of titanium silicide, 4.5 wt % of nickel, and 3 wt % of molybdenum; and the middle layer is composed of following raw materials in percentage by mass: 65-70 wt % of titanium carbonitride, 15 wt % of tungsten-titanium carbide, 5-10 wt % of titanium silicide, 6 wt % of nickel, and 4 wt % of molybdenum.

Further, when the structure includes 7 layers, the surface layer is composed of following raw materials in percentage by mass: 50-55 wt % of titanium carbonitride, 25 wt % of tungsten-titanium carbide, 15-20 wt % of titanium silicide, 3 wt % of nickel, and 2 wt % of molybdenum; the secondary surface layer is composed of following raw materials in percentage by mass: 57.5-62.5 wt % of titanium carbonitride, 20 wt % of tungsten-titanium carbide, 10-15 wt % of titanium silicide, 4.5 wt % of nickel, and 3 wt % of molybdenum; the middle layer is composed of following raw materials in percentage by mass: 65-70 wt % of titanium carbonitride, 15 wt % of tungsten-titanium carbide, 5-10 wt % of titanium silicide, 6 wt % of nickel, and 4 wt % of molybdenum; and the central layer is composed of following raw materials in percentage by mass: 80 wt % of titanium carbonitride, 5 wt % of tungsten-titanium carbide, 9 wt % of nickel, and 6 wt % of molybdenum.

Further, a particle size of titanium carbonitride is 0.5-1 μm; a particle size of tungsten-titanium carbide is 0.5-1.5

μm; a particle size of titanium silicide is 0.5-1.5 μm; a particle size of nickel is 0.5-1 μm; and a particle size of molybdenum is 0.5-1 μm.

In a second aspect, the present disclosure provides a method for preparing the crack self-healing functionally gradient material for ceramic cutting tools, which includes:
(1) performing ball milling on titanium carbonitride, tungsten-titanium carbide, titanium silicide, nickel, and molybdenum, respectively; and then drying and sieving a resulting mixture to obtain raw powder;
(2) preparing raw materials based on proportions set for each layer, and performing ball milling, drying and sieving on the raw materials of each layer to obtain a mixed material; and
(3) loading the mixed material by using a layered powder filling method; after compression molding, performing hot-pressing sintering on a resulting product to obtain the crack self-healing functionally gradient material for ceramic cutting tools.

Further, in steps (1) and (2), absolute ethanol is used as a ball milling medium, and hard-alloy balls are used for ball milling.

Further, a ball milling time in step (1) is 50-72 hours.

Further, a ball milling time in step (2) is 30-50 hours.

Further, in both steps (1) and (2), a 100-mesh sieve is used for sieving.

Further, conditions for vacuum hot-pressing sintering include: heating from 15-25° C. to 950-1050° C. at a heating rate of 20-40° C./min; then, heating to 1350-1550° C. at a heating rate of 15-25° C./min, and a pressure is uniformly increased to 30-34 MPa at the same time; and preserving the heat and pressure for 20-40 min.

Compared with the prior art, the present disclosure has the significant advantages as follows:
(1) In the preparation method provided by the present disclosure, $TiSi_2$ particles added can heal microcracks that are produced during the processing and use of ceramic materials, thus recovering the strength of the materials, prolonging the service life of the materials and improving the safety. Due to the gradient layered distribution of $Ti(C_7,N_3)$, $(W_7,Ti_3)C$, Ni and Mo, the mechanical properties of the materials for cutting tools change in a gradient step manner, which can effectively alleviate residual heat stress and improve the thermal shock resistance of the whole materials.
(2) In the preparation method provided by the present disclosure, a heat treatment temperature required by healing cracks of the self-healing material for ceramic cutting tools, which is added with $TiSi_2$ particles, is greatly reduced and a time required is greatly shortened; and cracks with a length of less than 600 μm in a ceramic matrix can be effectively healed.
(3) Equipment used in the present disclosure is simple and good in safety, stable in preparation process, simple in operation and processing, and high in production efficiency.

BRIEF DESCRIPTION OF THE DRAWINGS

The accompanying drawings constituting a part of the present disclosure are used for providing a further understanding of the present disclosure. The schematic embodiments and description of the present disclosure are intended to explain the present disclosure, and do not constitute improper restriction to the present disclosure.

DETAILED DESCRIPTION

Figure 1:
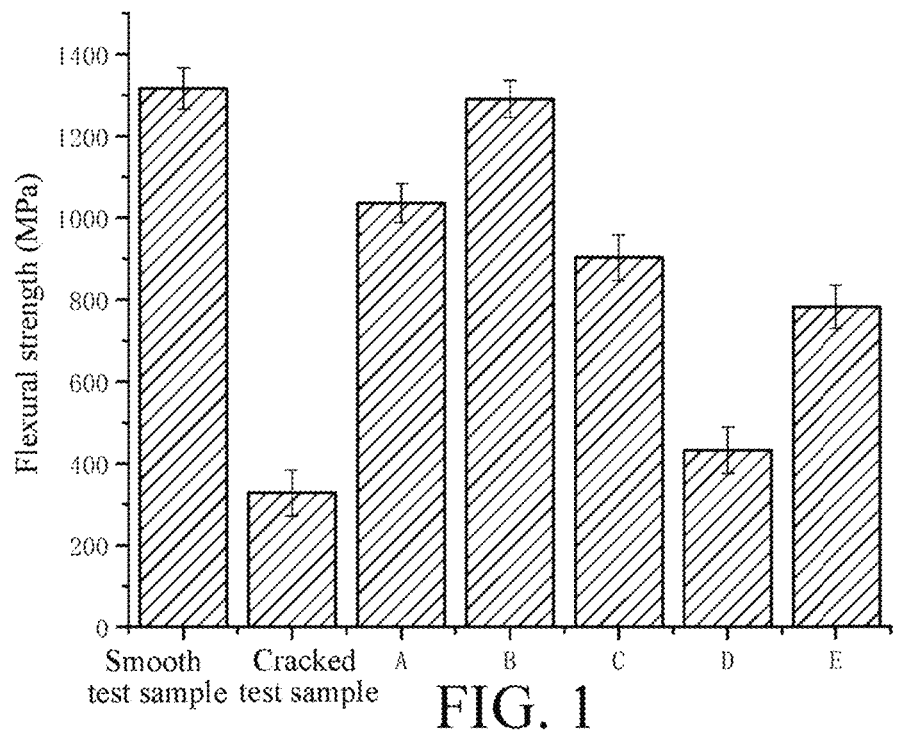
FIG. 1 is a diagram showing recovery of flexural strength of crack self-healing materials for ceramic cutting tools prepared in Example 1, Example 2, Example 3, Comparative Example 1 and Comparative Example 2 before and after heat treatment.

It should be noted that the following detailed descriptions are all exemplary and are intended to provide a further description of the present disclosure. Unless otherwise specified, all technical and scientific terms used in the present disclosure have the same meanings as commonly understood by a person of ordinary skill in the art to which the present disclosure belongs.

Example 1

A crack self-healing functionally gradient material with a three-layered gradient structure for ceramic cutting tools, in which a surface layer was composed of the following raw materials in percentage by mass: 50 wt % of $Ti(C_7,N_3)$, 25 wt % of $(W_7,Ti_3)C$, 20 wt % of $TiSi_2$, 3 wt % of Ni, and 2 wt % of Mo; and a secondary surface layer was composed of the following raw materials in percentage by mass: 57.5 wt % of $Ti(C_7,N_3)$, 20 wt % of $(W_7,Ti_3)C$, 15 wt % of $TiSi_2$, 4.5 wt % of Ni, and 3 wt % of Mo.

Absolute ethanol was used as a medium for separately performing ball milling on raw material powder of titanium carbonitride, tungsten-titanium carbide, titanium silicide, nickel, and molybdenum, respectively. A ball milling process was carried out on a roller type ball mill and lasted for 72 hours; then a resulting product was dried in vacuum at a drying temperature of 120° C.; and after drying, the product was sieved with a 100-mesh sieve and sieved powder was packaged for later use. Powder used for the surface layer and powder used for the secondary surface layer were weighed, respectively, and then were poured into a mixing barrel, respectively; absolute ethanol was added as the medium to perform ball milling on the ball mill for 48 hours, so as to mix materials in various phases more uniformly; and then, a mixed product was dried at 120° C. in vacuum and sieved with a 100-mesh sieve to obtain composite ceramic material powder with good dispersity for each layer, and the powder was packaged for later use. Through a layered powder filling method, the mixed composite ceramic material powder was filled into a graphite mold, and the graphite mold was put into a vacuum hot-pressing sintering furnace to undergo a hot-pressing sintering process with uniform pressurization in a vacuum environment; the powder was heated from 20° C. to 1000° C. at a heating rate of 30° C./min, and then was heated to 1450° C. at a heating rate of 20° C./min, with a pressure uniformly increased to 32 MPa; the heat and pressure were preserved for 30 min; after that, a resulting product underwent water cooling in a furnace to 200° C., and was cooled to 20° C. along with the furnace to obtain the crack self-healing functionally gradient material for ceramic cutting tools. The prepared crack self-healing functionally gradient material for ceramic cutting tools had a flexural strength of 1020-1103 MPa, a Vickers hardness of 18.7-19.52 GPa, and a fracture toughness of 5.95-6.25 MPa·m$^{1/2}$.

The crack self-healing ceramic material prepared in this example was cut into a standard test sample strip with a size of 3 mm×4 mm×35 mm, and then the test sample strip was ground, polished and chamfered. In a bending test, a crack with a size of 400-500 μm was prefabricated in a center of a tension surface by using a Vickers hardness indenter. The crack test sample was subjected to heat treatment in a high temperature air furnace at a heat treatment temperature of 800° C., with the heat preserved for 60 min; the crack test sample after heat treatment was subjected to a bending test at room temperature; and after self-healing treatment, the strength of the test sample was improved to 1036.02 MPa from 327.59 MPa under which cracks were produced. It is found that the cracks are basically healed after observing the crack morphology of the materials.

Example 2

A crack self-healing functionally gradient material with a five-layered gradient structure for ceramic cutting tools, in which a surface layer was composed of the following raw materials in percentage by mass: 50 wt % of Ti($C_7,N_3$), 25 wt % of ($W_7,Ti_3$)C, 20 wt % of $TiSi_2$, 3 wt % of Ni, and 2 wt % of Mo; a secondary surface layer was composed of the following raw materials in percentage by mass: 57.5 wt % of Ti($C_7,N_3$), 20 wt % of ($W_7,Ti_3$)C, 15 wt % of $TiSi_2$, 4.5 wt % of Ni, and 3 wt % of Mo; and a middle layer was composed of the following raw materials in percentage by mass: 65 wt % of Ti($C_7,N_3$), 15 wt % of ($W_7,Ti_3$)C, 10 wt % of $TiSi_2$, 6 wt % of Ni, and 4 wt % of Mo.

Absolute ethanol was used as a medium for separately performing ball milling on raw material powder of titanium carbonitride, tungsten-titanium carbide, titanium silicide, nickel, and molybdenum, respectively. A ball milling process was carried out on a roller type ball mill and lasted for 72 hours; then a resulting product was dried in vacuum at a drying temperature of 120° C.; and after drying, the product was sieved with a 100-mesh sieve and sieved powder was packaged for later use. Powder used for the surface layer, powder used for the secondary surface layer, and powder used for the middle layer were weighed, respectively, and then were poured into a mixing barrel, respectively; absolute ethanol was added as the medium to perform ball milling on the ball mill for 48 hours, so as to mix materials in various phases more uniformly; and then, a mixed product was dried at 120° C. in vacuum and sieved with a 100-mesh sieve to obtain composite ceramic material powder with good dispersity for each layer, and the powder was packaged for later use. Through a layered powder filling method, the mixed composite ceramic material powder was filled into a graphite mold, and the graphite mold was put into a vacuum hot-pressing sintering furnace to undergo a hot-pressing sintering process with uniform pressurization in a vacuum environment; the powder was heated from 20° C. to 1000° C. at a heating rate of 30° C./min, and then was heated to 1450° C. at a heating rate of 20° C./min, with a pressure uniformly increased to 32 MPa; the heat and pressure were preserved for 30 min; after that, a resulting product underwent water cooling in a furnace to 200° C., and was cooled to 20° C. along with the furnace to obtain the crack self-healing functionally gradient material for ceramic cutting tools. The prepared crack self-healing functionally gradient material for ceramic cutting tools had a flexural strength of 1274-1357 MPa, a Vickers hardness of 18.95-19.55 GPa, and a fracture toughness of 6.44-6.78 MPa·m$^{1/2}$.

The crack self-healing ceramic material prepared in this example was cut into a standard test sample strip with a size of 3 mm×4 mm×35 mm, and then the test sample strip was ground, polished and chamfered. In a bending test, a crack with a size of 400-500 μm was prefabricated in a center of a tension surface by using a Vickers hardness indenter. The crack test sample was subjected to heat treatment in a high temperature air furnace at a heat treatment temperature of 800° C., with the heat preserved for 60 min; the crack test sample after heat treatment was subjected to a bending test at room temperature; and after self-healing treatment, the strength of the test sample was improved to 1290.51 MPa from 327.59 MPa under which cracks were produced. It is found that the cracks are basically healed after observing the crack morphology of the materials.

Example 3

A crack self-healing functionally gradient material with a seven-layered gradient structure for ceramic cutting tools, in which a surface layer was composed of the following raw materials in percentage by mass: 50 wt % of Ti($C_7,N_3$), 25 wt % of ($W_7,Ti_3$)C, 20 wt % of $TiSi_2$, 3 wt % of Ni, and 2 wt % of Mo; a secondary surface layer was composed of the following raw materials in percentage by mass: 57.5 wt % of Ti($C_7,N_3$), 20 wt % of ($W_7,Ti_3$)C, 15 wt % of $TiSi_2$, 4.5 wt % of Ni, and 3 wt % of Mo; a middle layer was composed of the following raw materials in percentage by mass: 65 wt % of Ti($C_7,N_3$), 15 wt % of ($W_7,Ti_3$)C, 10 wt % of $TiSi_2$, 6 wt % of Ni, and 4 wt % of Mo; and a central layer was composed of the following raw materials in percentage by mass: 80 wt % of Ti($C_7,N_3$), 5 wt % of ($W_7,Ti_3$)C, 9 wt % of Ni, and 6 wt % of Mo.

Absolute ethanol was used as a medium for separately performing ball milling on raw material powder of titanium carbonitride, tungsten-titanium carbide, titanium silicide, nickel, and molybdenum, respectively. A ball milling process was carried out on a roller type ball mill and lasted for 72 hours; then a resulting product was dried in vacuum at a drying temperature of 120° C.; and after drying, the product was sieved with a 100-mesh sieve and sieved powder was packaged for later use. Powder used for the surface layer, powder used for the secondary surface layer, powder used for the middle layer, and powder used for the central layer were weighed, respectively, and then were poured into a mixing barrel, respectively; absolute ethanol was added as the medium to perform ball milling on the ball mill for 48 hours, so as to mix materials in various phases more uniformly; and then, a mixed product was dried at 120° C. in vacuum and sieved with a 100-mesh sieve to obtain composite ceramic material powder with good dispersity for each layer, and the powder was packaged for later use. Through a layered powder filling method, the mixed composite ceramic material powder was filled into a graphite mold, and the graphite mold was put into a vacuum hot-pressing sintering furnace to undergo a hot-pressing sintering process with uniform pressurization in a vacuum environment; the powder was heated from 20° C. to 1000° C. at a heating rate of 30° C./min, and then was heated to 1450°

C. at a heating rate of 20° C./min, with a pressure uniformly increased to 32 MPa; the heat and pressure were preserved for 30 min; after that, a resulting product underwent water cooling in a furnace to 200° C., and was cooled to 20° C. along with the furnace to obtain the crack self-healing functionally gradient material for ceramic cutting tools. The prepared crack self-healing functionally gradient material for ceramic cutting tools had a flexural strength of 916-956 MPa, a Vickers hardness of 18.67-19.41 GPa, and a fracture toughness of 6.29-6.63 MPa·m$^{1/2}$.

The crack self-healing ceramic material prepared in this example was cut into a standard test sample strip with a size of 3 mm×4 mm×35 mm, and then the test sample strip was ground, polished and chamfered. In a bending test, a crack with a size of 400-500 μm was prefabricated in a center of a tension surface by using a Vickers hardness indenter. The crack test sample was subjected to heat treatment in a high temperature air furnace at a heat treatment temperature of 800° C., with the heat preserved for 60 min; the crack test sample after heat treatment was subjected to a bending test at room temperature; and after self-healing treatment, the strength of the test sample was improved to 902.3 MPa from 327.59 MPa under which cracks were produced. It is found that the cracks are basically healed after observing the crack morphology of the materials.

Comparative Example 1

A crack self-healing functionally gradient material with a five-layered gradient structure for ceramic cutting tools, in which a surface layer was composed of the following raw materials in percentage by mass: 50 wt % of Ti(C$_7$,N$_3$), 25 wt % of (W$_7$,Ti$_3$)C, 20 wt % of TiSi$_2$, 3 wt % of Ni, and 2 wt % of Mo; a secondary surface layer was composed of the following raw materials in percentage by mass: 57.5 wt % of Ti(C$_7$,N$_3$), 20 wt % of (W$_7$,Ti$_3$)C, 15 wt % of TiSi$_2$, 4.5 wt % of Ni, and 3 wt % of Mo; and a middle layer was composed of the following raw materials in percentage by mass: 65 wt % of Ti(C$_7$,N$_3$), 15 wt % of (W$_7$,Ti$_3$)C, 10 wt % of TiSi$_2$, 6 wt % of Ni, and 4 wt % of Mo.

Absolute ethanol was used as a medium for separately performing ball milling on raw material powder of titanium carbonitride, tungsten-titanium carbide, titanium silicide, nickel, and molybdenum, respectively. A ball milling process was carried out on a roller type ball mill and lasted for 72 hours; then a resulting product was dried in vacuum at a drying temperature of 120° C.; and after drying, the product was sieved with a 100-mesh sieve and sieved powder was packaged for later use. Powder used for the surface layer, powder used for the secondary surface layer, and powder used for the middle layer were weighed, respectively, and then were poured into a mixing barrel, respectively; absolute ethanol was added as the medium to perform ball milling on the ball mill for 48 hours, so as to mix materials in various phases more uniformly; and then, a mixed product was dried at 120° C. in vacuum and sieved with a 100-mesh sieve to obtain composite ceramic material powder with good dispersity for each layer, and the powder was packaged for later use. Through a layered powder filling method, the mixed composite ceramic material powder was filled into a graphite mold, and the graphite mold was put into a vacuum hot-pressing sintering furnace to undergo a hot-pressing sintering process with uniform pressurization in a vacuum environment; the powder was heated from 20° C. to 1000° C. at a heating rate of 30° C./min, and then was heated to 1450° C. at a heating rate of 20° C./min, with a pressure uniformly increased to 32 MPa; the heat and pressure were preserved for 30 min; after that, a resulting product underwent water cooling in a furnace to 200° C., and was cooled to 20° C. along with the furnace to obtain the crack self-healing functionally gradient material for ceramic cutting tools. The prepared crack self-healing functionally gradient material for ceramic cutting tools had a flexural strength of 1274-1357 MPa, a Vickers hardness of 18.95-19.55 GPa, and a fracture toughness of 6.44-6.78 MPa·m$^{1/2}$.

The crack self-healing ceramic material prepared in this example was cut into a standard test sample strip with a size of 3 mm×4 mm×35 mm, and then the test sample strip was ground, polished and chamfered. In a bending test, a crack with a size of 400-500 μm was prefabricated in a center of a tension surface by using a Vickers hardness indenter. The crack test sample was subjected to heat treatment in a vacuum tube furnace at a heat treatment temperature of 800° C., with the heat preserved for 60 min; the crack test sample after heat treatment was subjected to a bending test at room temperature; and after self-healing treatment, the strength of the test sample was improved to 432.17 MPa from 327.59 MPa under which cracks were produced. It is found that only part of the cracks are healed after observing the crack morphology of the materials, and a healing mechanism is element diffusion in the ceramic material.

It can be seen from Comparative Example 1 that when the heat treatment is performed in the vacuum atmosphere, the ceramic material is not oxidized, and therefore, no oxidation products fill the cracks and the self-healing effect of the cracks is relatively poor. Due to the element diffusion in the material for cutting tools, the flexural strength is partially recovered. However, the element diffusion effect is not obvious due to low healing temperature and short heat preservation time, and therefore, only part of flexural strength is improved. Compared with Comparative Example 2, it can be seen that the heat treatment atmosphere has a significant influence on the self-healing effect of cracks on this ceramic material, and the ceramic material has a relatively good crack self-healing effect in an oxygen atmosphere.

Comparative Example 2

A crack self-healing functionally gradient material with a five-layered gradient structure for ceramic cutting tools, in which a surface layer was composed of the following raw materials in percentage by mass: 50 wt % of Ti(C$_7$,N$_3$), 25 wt % of (W$_7$,Ti$_3$)C, 20 wt % of TiSi$_2$, 3 wt % of Ni, and 2 wt % of Mo; a secondary surface layer was composed of the following raw materials in percentage by mass: 65 wt % of Ti(C$_7$,N$_3$), 15 wt % of (W$_7$,Ti$_3$)C, 10 wt % of TiSi$_2$, 6 wt % of Ni, and 4 wt % of Mo; and a middle layer was composed of the following raw materials in percentage by mass: 80 wt % of Ti(C$_7$,N$_3$), 5 wt % of (W$_7$,Ti$_3$)C, 9 wt % of Ni, and 6 wt % of Mo.

Absolute ethanol was used as a medium for separately performing ball milling on raw material powder of titanium carbonitride, tungsten-titanium carbide, titanium silicide, nickel, and molybdenum, respectively. A ball milling process was carried out on a roller type ball mill and lasted for 72 hours; then a resulting product was dried in vacuum at a drying temperature of 120° C.; and after drying, the product was sieved with a 100-mesh sieve and sieved powder was packaged for later use. Powder used for the surface layer, powder used for the middle layer, and powder used for the central layer were weighed, respectively, and then were poured into a mixing barrel, respectively; absolute ethanol was added as the medium to perform ball milling on the ball mill for 48 hours, so as to mix materials in various phases more uniformly; and then, a mixed product was dried at 120° C. in vacuum and sieved with a 100-mesh sieve to obtain composite ceramic material powder with good dispersity for each layer, and the powder was packaged for later use. Through a layered powder filling method, the mixed composite ceramic material powder was filled into a graphite mold, and the graphite mold was put into a vacuum hot-pressing sintering furnace to undergo a hot-pressing sintering process with uniform pressurization in a vacuum environment; the powder was heated from 20° C. to 1000° C. at a heating rate of 30° C./min, and then was heated to 1450° C. at a heating rate of 20° C./min, with a pressure uniformly increased to 32 MPa; the heat and pressure were preserved for 30 min; after that, a resulting product underwent water cooling in a furnace to 200° C., and was cooled to 20° C. along with the furnace to obtain the crack self-healing functionally gradient material for ceramic cutting tools. The prepared crack self-healing functionally gradient material for ceramic cutting tools had a flexural strength of 1080-1190 MPa, a Vickers hardness of 18.68-19.42 GPa, and a fracture toughness of 6.29-6.63 MPa·m$^{1/2}$.

The crack self-healing ceramic material prepared in this example was cut into a standard test sample strip with a size of 3 mm×4 mm×35 mm, and then the test sample strip was ground, polished and chamfered. In a bending test, a crack with a size of 500-600 μm was prefabricated in a center of a tension surface by using a Vickers hardness indenter. The crack test sample was subjected to heat treatment in a high temperature air furnace at a heat treatment temperature of 800° C., with the heat preserved for 60 min; the crack test sample after heat treatment was subjected to a bending test at room temperature; and after self-healing treatment, the strength of the test sample was improved to 782.36 MPa from 327.59 MPa under which cracks were produced. It is found that an area with large cracks is not completely filled for healing by oxidation products after observing the crack morphology of the materials, thereby resulting in low recovery of the material strength. It is also proved that when a crack length exceeds 600 μm, a crack width is relatively wide and oxidation products produced cannot effectively heal the cracks.

It can be seen from Comparative Example 2 that the length of the prefabricated crack exceeds 600 μm and the oxidization products produced are not enough to fill the area with large cracks. Compared with Example 2, it can be concluded that the ceramic material has good crack self-healing performance only if a dosage range is reasonable and the length of cracks is in a specified range.

FIG. 1 shows a recovery condition of flexural strength before and after heat treatment of the prepared crack self-healing materials for ceramic cutting tools; a smooth test sample is one without prefabricated cracks on the ceramic cutting tool in Example 2, and a cracked test sample is one with prefabricated cracks in Example 2; A represents the flexural strength of the crack self-healing material for ceramic cutting tools prepared in Example 1 after heat treatment; B represents the flexural strength of the crack self-healing material for ceramic cutting tools prepared in Example 2 after heat treatment; C represents the flexural strength of the crack self-healing material for ceramic cutting tools prepared in Example 3 after heat treatment; D represents the flexural strength of the crack self-healing material for ceramic cutting tools prepared in Comparative Example 1 after vacuum heat treatment; and E represents the flexural strength of the crack self-healing material for ceramic cutting tools prepared in Comparative Example 2 after heat treatment.

Figure 2:
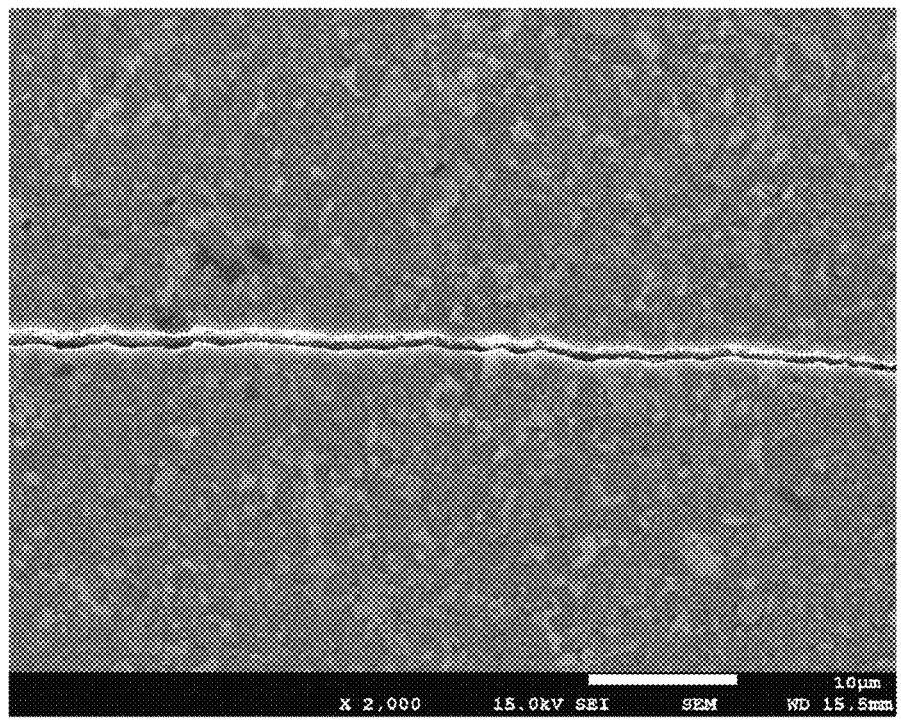
FIG. 2 is a microtopography graph showing prefabricated cracks of a crack self-healing material for ceramic cutting tools prepared in Example 2.

FIG. 2 shows the microtopography of prefabricated cracks of the crack self-healing material for ceramic cutting tools prepared in Example 2.

Figure 3:
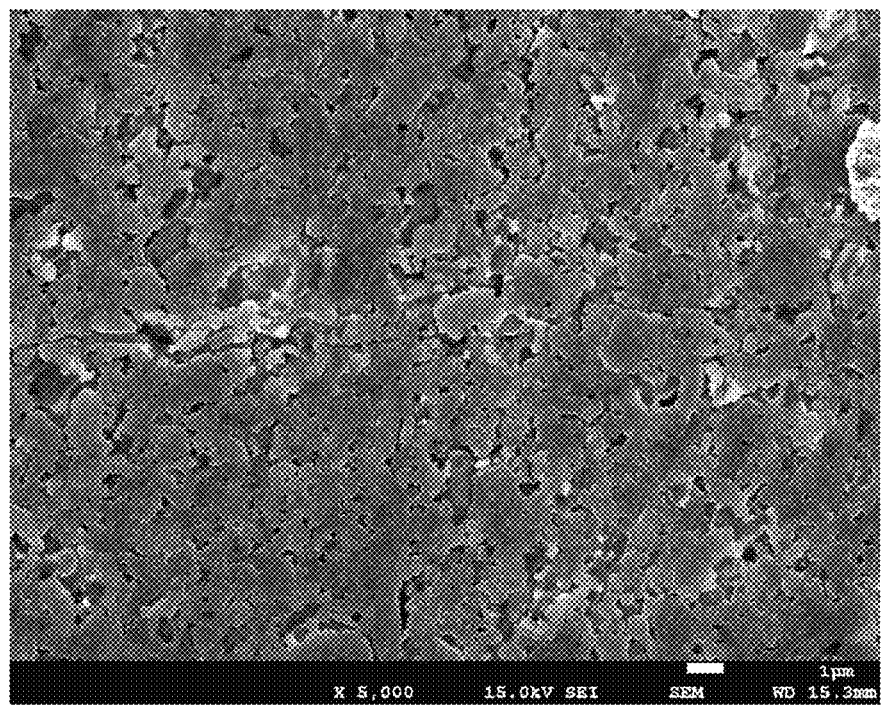
FIG. 3 is a microtopography graph showing cracks of a crack self-healing material for ceramic cutting tools prepared in Example 2 after heat treatment.

FIG. 3 is a microtopography graph showing cracks of the crack self-healing material for ceramic cutting tools prepared in Example 2 after heat treatment, and it can be seen that the cracks are healed after heat treatment.

Figure 4:
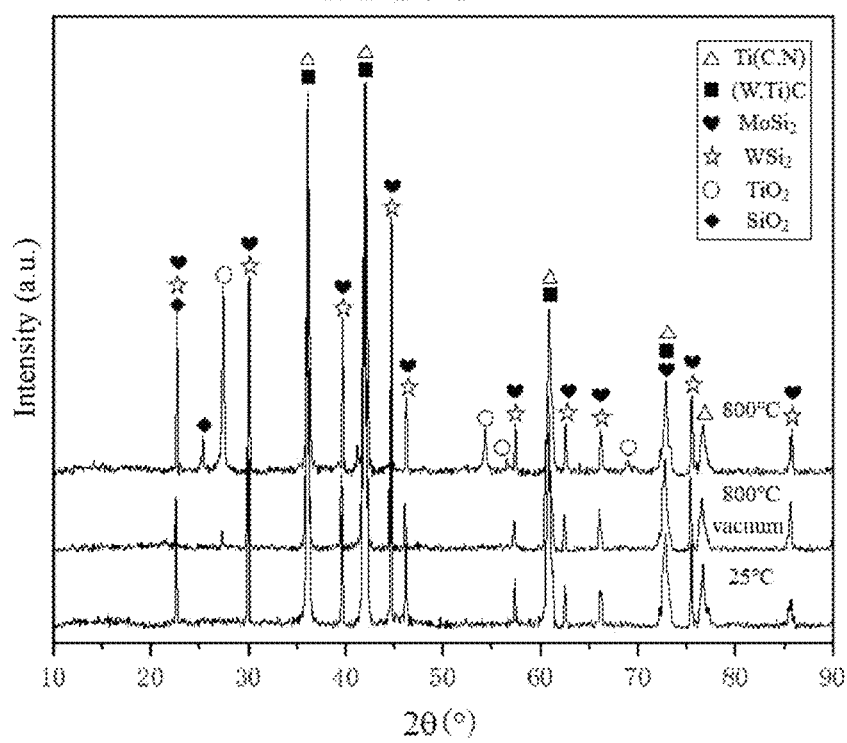
FIG. 4 is an XRD graph showing a surface of a crack self-healing material for ceramic cutting tools prepared in Example 2 before and after heat treatment, and a surface of a crack self-healing material for ceramic cutting tools prepared in Comparative Example 1 after vacuum heat treatment.

FIG. 4 is an XRD graph showing a surface of the crack self-healing material for ceramic cutting tools prepared in Example 2 before and after heat treatment, and a surface of the crack self-healing material for ceramic cutting tools prepared in Comparative Example 1 after vacuum heat treatment. It can be seen from FIG. 4 that titanium dioxide and silicon dioxide are formed on the cracks after heat treatment in Example 2. No oxide is produced after vacuum heat treatment in Comparative Example 1.

Figure 5:
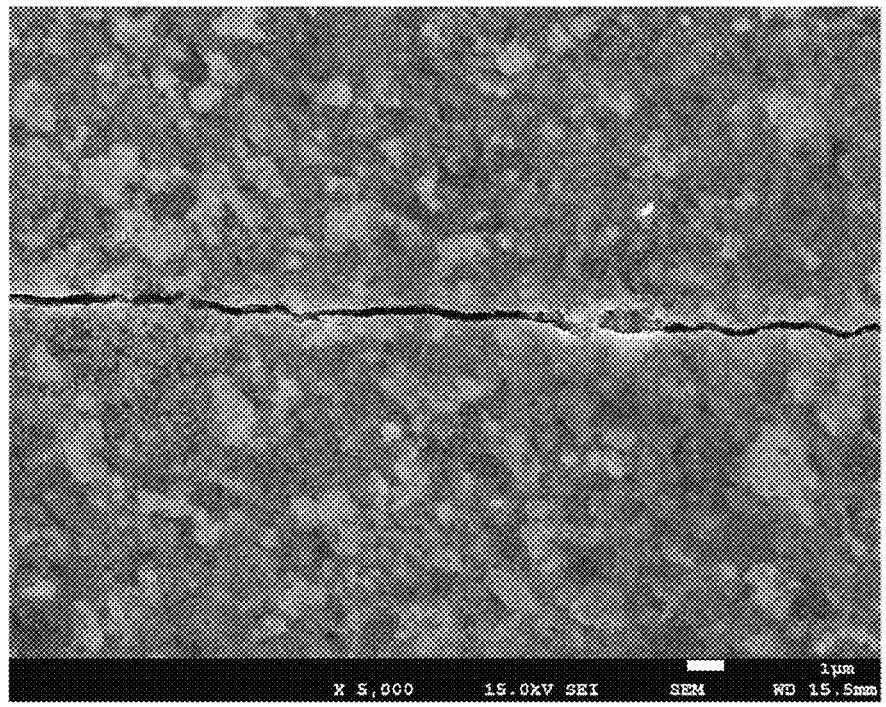
FIG. 5 is a microtopography graph showing cracks of a crack self-healing material for ceramic cutting tools prepared in Comparative Example 1 after heat treatment.

FIG. 5 is a microtopography graph showing cracks of the crack self-healing material for ceramic cutting tools prepared in Comparative Example 1 after heat treatment, and it can be seen that only part of the cracks are healed after vacuum heat treatment.

Figure 6:
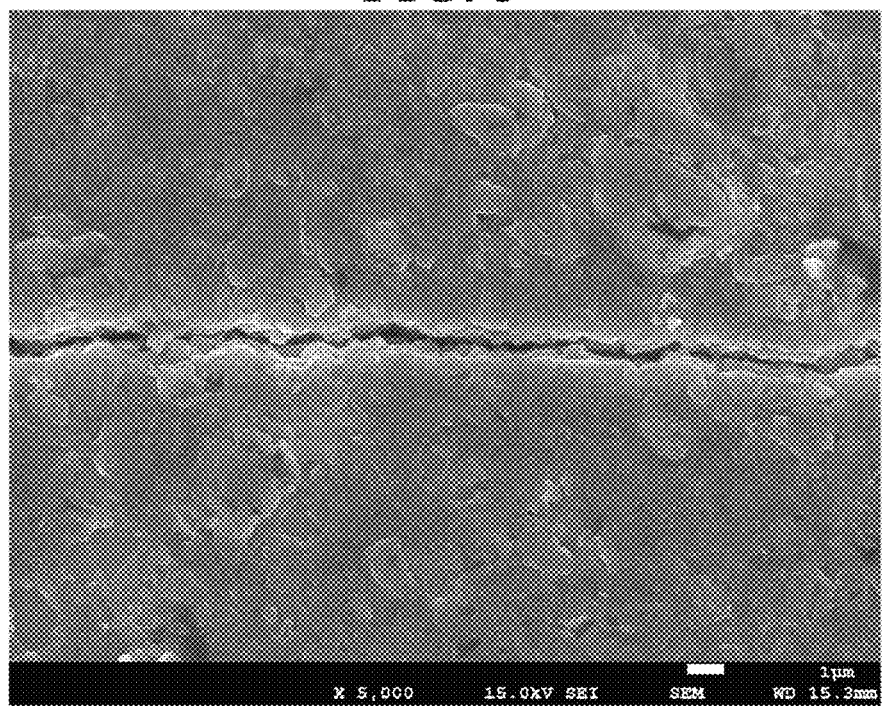
FIG. 6 is a microtopography graph showing cracks of a crack self-healing material for ceramic cutting tools prepared in Comparative Example 2 after heat treatment.

FIG. 6 is a microtopography graph showing cracks of the crack self-healing material for ceramic cutting tools prepared in Comparative Example 2 after heat treatment, and it can be seen that the oxidation products produced when the crack length exceeds 600 μm cannot effectively heal the cracks.

The ceramic material in the present disclosure will undergo an obvious oxidization reaction in the air in case of high-temperature heat treatment, and TiSi and TiC phases mainly undergo the following chemical reactions during oxidization:

$$TiSi + 2O_2 \rightarrow TiO_2 + SiO_2 \qquad (1)$$

$$2TiC + O_2 \rightarrow 2TiO + 2C \qquad (2)$$

$$TiO + O_2 + C \rightarrow TiO_2 + CO \qquad (3)$$

The above descriptions are merely preferred embodiments of the present disclosure and are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A crack self-healing functionally gradient material for ceramic cutting tools, wherein the material takes titanium carbonitride as a matrix phase, tungsten-titanium carbide and titanium silicide as enhanced phases, and nickel and molybdenum as metal additive phases; the crack self-healing functionally gradient material for ceramic cutting tools has a symmetrical gradient layered structure, a content of titanium carbonitride increases gradually from a surface layer to a central layer, contents of tungsten-titanium carbide and titanium silicide decrease by 5% gradually from the surface layer to the central layer, and contents of nickel and molybdenum increase gradually from the surface layer to the central layer.

2. The material for ceramic cutting tools according to claim 1,
wherein the symmetrical gradient layered structure comprises 3 layers, 5 layers, or 7 layers.

3. The material for ceramic cutting tools according to claim 2, wherein when the structure comprises 3 layers, a thickness of a three-layered gradient layer is determined based on a formula: thickness of surface layer/thickness of secondary surface layer=0.3; when the structure comprises 5 layers, a thickness of a five-layered gradient layer is determined based on a formula: thickness of surface layer/thickness of secondary surface layer=thickness of secondary surface layer/thickness of middle layer=0.3; and when the structure comprises 7 layers, a thickness of a seven-layered gradient layer is determined based on a formula: thickness of surface layer/thickness of secondary surface layer=thickness of secondary surface layer/thickness of middle layer=thickness of middle layer/thickness of central layer=0.3.

4. The material for ceramic cutting tools according to claim 2,
wherein when the structure comprises 3 layers, the surface layer is composed of following raw materials in percentage by mass: 50-55 wt % of titanium carbonitride, 25 wt % of tungsten-titanium carbide, 15-20 wt % of titanium silicide, 3 wt % of nickel, and 2 wt % of molybdenum; and the secondary surface layer is composed of following raw materials in percentage by mass: 57.5-62.5 wt % of titanium carbonitride, 20 wt % of tungsten-titanium carbide, 10-15 wt % of titanium silicide, 4.5 wt % of nickel, and 3 wt % of molybdenum;

or, when the structure comprises 5 layers, the surface layer is composed of following raw materials in percentage by mass: 50-55 wt % of titanium carbonitride, 25 wt % of tungsten-titanium carbide, 15-20 wt % of titanium silicide, 3 wt % of nickel, and 2 wt % of molybdenum; the secondary surface layer is composed of following raw materials in percentage by mass: 57.5-62.5 wt % of titanium carbonitride, 20 wt % of tungsten-titanium carbide, 10-15 wt % of titanium silicide, 4.5 wt % of nickel, and 3 wt % of molybdenum; and the middle layer is composed of following raw materials in percentage by mass: 65-70 wt % of titanium carbonitride, 15 wt % of tungsten-titanium carbide, 5-10 wt % of titanium silicide, 6 wt % of nickel, and 4 wt % of molybdenum;

or, when the structure comprises 7 layers, the surface layer is composed of following raw materials in percentage by mass: 50-55 wt % of titanium carbonitride, 25 wt % of tungsten-titanium carbide, 15-20 wt % of titanium silicide, 3 wt % of nickel, and 2 wt % of molybdenum; the secondary surface layer is composed of following raw materials in percentage by mass: 57.5-62.5 wt % of titanium carbonitride, 20 wt % of tungsten-titanium carbide, 10-15 wt % of titanium silicide, 4.5 wt % of nickel, and 3 wt % of molybdenum; the middle layer is composed of following raw materials in percentage by mass: 65-70 wt % of titanium carbonitride, 15 wt % of tungsten-titanium carbide, 5-10 wt % of titanium silicide, 6 wt % of nickel, and 4 wt % of molybdenum; and the central layer is composed of following raw materials in percentage by mass: 80 wt % of titanium carbonitride, 5 wt % of tungsten-titanium carbide, 9 wt % of nickel, and 6 wt % of molybdenum.

5. The material for ceramic cutting tools according to claim 1, wherein a particle size of titanium carbonitride is 0.5-1 μm; a particle size of tungsten-titanium carbide is 0.5-1.5 μm; a particle size of titanium silicide is 0.5-1.5 μm; a particle size of nickel is 0.5-1 μm; and a particle size of molybdenum is 0.5-1 μm.

6. A method for preparing the material for ceramic cutting tools according to claim 1, comprising:
(1) performing ball milling on titanium carbonitride, tungsten-titanium carbide, titanium silicide, nickel, and molybdenum, respectively; and then drying and sieving a resulting mixture to obtain raw powder;
(2) preparing raw materials based on proportions set for each layer, and performing ball milling, drying and sieving on the raw materials of each layer to obtain a mixed material; and
(3) loading the mixed material by using a layered powder filling method; after compression molding, performing hot-pressing sintering on a resulting product to obtain the crack self-healing functionally gradient material for ceramic cutting tools.

7. The preparation method according to claim 6, wherein in steps (1) and (2), absolute ethanol is used as a ball milling medium, and hard-alloy balls are used for ball milling; a ball milling time in step (1) is 50-72 hours; and a ball milling time in step (2) is 30-50 hours.

8. The preparation method according to claim 6, wherein in both steps (1) and (2), a 100-mesh sieve is used for sieving.

9. The preparation method according to claim 6, wherein conditions for vacuum hot-pressing sintering comprise: heating from 15-25° C. to 950-1050° C. at a heating rate of 20-40° C./min; then, heating to 1350-1550° C. at a heating rate of 15-25° C./min, and a pressure is uniformly increased to 30-34 MPa at the same time; and preserving the heat and pressure for 20-40 min.

* * * * *